(12) United States Patent
Huang et al.

(10) Patent No.: US 8,146,389 B2
(45) Date of Patent: Apr. 3, 2012

(54) FIBER USED IN WIDEBAND AMPLIFIED SPONTANEOUS EMISSION LIGHT SOURCE AND THE METHOD OF MAKING THE SAME

(75) Inventors: Sheng-Lung Huang, Kaohsiung (TW); Chia-Yao Lo, Kaohsiung (TW); Kwang-Yao Huang, Kaohsiung (TW); Shih-Yu Tu, Sijhih (TW); Hsiao-Wen Lee, Hsinchu (TW); Sheng-Pan Huang, Hsinchu (TW); Sun-Bin Yin, Hsinchu (TW)

(73) Assignee: National Sun Yat-Sen University, Kaohsiung (TW)

( * ) Notice: Subject to any disclaimer, the term of this patent is extended or adjusted under 35 U.S.C. 154(b) by 1369 days.

(21) Appl. No.: 11/378,458

(22) Filed: Mar. 17, 2006

(65) Prior Publication Data

US 2006/0174658 A1    Aug. 10, 2006

Related U.S. Application Data

(62) Division of application No. 10/996,749, filed on Nov. 24, 2004, now Pat. No. 7,352,949.

(51) Int. Cl.
  C03B 37/01 (2006.01)
  C03B 37/15 (2006.01)
  C03C 25/62 (2006.01)
(52) U.S. Cl. ............ 65/392; 65/412; 65/425; 65/441
(58) Field of Classification Search .......... 65/392, 65/412, 406, 425, 441
  See application file for complete search history.

(56) References Cited

U.S. PATENT DOCUMENTS

| | | | |
|---|---|---|---|
| 3,989,350 A | 11/1976 | Cohen et al. | |
| 4,421,721 A * | 12/1983 | Byer et al. | 117/202 |
| 5,717,517 A * | 2/1998 | Alfano et al. | 359/342 |
| 6,141,475 A | 10/2000 | Lawrence et al. | |
| 6,297,179 B1 | 10/2001 | Beall et al. | |
| 6,584,261 B2 * | 6/2003 | Martinelli et al. | 385/122 |
| 6,660,669 B2 | 12/2003 | Beall et al. | |
| 6,698,246 B1 | 3/2004 | Beall et al. | |
| 7,058,267 B2 | 6/2006 | Neuhaus et al. | |
| 2002/0056291 A1 * | 5/2002 | Schultz et al. | 65/392 |
| 2005/0204780 A1 * | 9/2005 | Moridaira et al. | 65/407 |

OTHER PUBLICATIONS

Ishibashi et. al. (Conf. Proc. Laser Electr. Optic. Soc. Annu. Meet., pp. 301-302. 1996).*
Lo, et al. "Glass-Clad $Cr^{4+}$:YAG Crystal Fiber for the Generation of Superwideband Amplified Spontaneous Emission" *Optics Letters* (2004) vol. 29, No. 5, pp. 439-441.

* cited by examiner

*Primary Examiner* — Jason L. Lazorcik
(74) *Attorney, Agent, or Firm* — Ladas & Parry LLP

(57) ABSTRACT

The present invention relates to a fiber having a core of crystal fiber doped with chromium and a glass cladding. The fiber has a gain bandwidth of more than 300 nm including 1.3 mm to 1.6 mm in optical communication, and can be used as light source, optical amplifier and tunable laser when being applied for optical fiber communication. The present invention also relates to a method of making the fiber. First, a chromium doped crystal fiber is grown by laser-heated pedestal growth (LHPG). Then, the crystal fiber is cladded with a glass cladding by codrawing laser-heated pedestal growth (CDLHPG). Because it is a high temperature manufacture process, the cladding manufactured by this method is denser than that by evaporation technique, and can endure relative high damage threshold power for the pumping light.

11 Claims, 8 Drawing Sheets

FIBER USED IN WIDEBAND AMPLIFIED SPONTANEOUS EMISSION LIGHT SOURCE AND THE METHOD OF MAKING THE SAME

This application is a divisional of application number 10/996,749 filed on Nov. 24, 2004, now U.S. Pat. No. 7,352,949 claims the benefit thereof and incorporates the same by reference.

BACKGROUND OF THE INVENTION

1. Field of the Invention

The present invention relates to a fiber and the method of making the same, and more particularly, to a fiber having a core doped with chromium and a glass cladding, and the method of making the same.

2. Description of the Related Art

Because of the breakthrough in the technology of fabricating optical fibers, it is possible to use the bandwidth of 300 nm including 1.3 µm to 1.6 µm in optical communication. The greatly increased communication capacity results in the emergence of wavelength-division multiplexing (WDM) technology, enabling tens of channels with different wavelengths transmitted simultaneously in an optical fiber. In consequence, the requirement of spectral characterization of all the optical components used in the optical transport networking systems raises.

Amplified spontaneous emission (ASE) light source has low coherence due to its wideband characteristic. Such characteristic enables the ASE light source to be a light source of a WDM system of sliced spectrum. In the WDM system, a light source module having multiple wavelengths is used. If a distributed feedback (DFB) laser is used for achieving multiple wavelengths, the cost and complexity of the system will increase. A wideband light source with a spectrum slicing technique, nevertheless, can generate a light source of multiple wavelengths easily. The conventional method of generating wideband light source from the ASE light source is to utilize an optical fiber doped with rare earth ions. For example, U.S. Pat. No. 6,658,189 disclosed an ASE light source by amplifying an Er-doped fiber with a pump wavelength of 980 nm. The bandwidth of the ASE light source is 80 nm, which includes a band of 1530 nm to 1610 nm wavelength. However, the band will be insufficient because of the greatly increased communication capacity.

There are many conventional methods for fabricating crystal fiber. U.S. Pat. No. 4,421,721 discloses a laser heated pedestal growth (LHPG) method, which can grow single crystal with small diameter easily and has the advantages of high growth speed, low consumption, easy of control and no crucible pollution. However, the smaller the diameter of the crystal fiber is, the greater the propagation loss will be caused. In order to reduce the propagation loss, the grown crystal fiber must be cladded.

The conventional cladding methods are described as follows.

1. In Diffusion

There are two types of such method. One is depositing an oxide layer on the outer surface of the crystal fiber, then diffusing the oxide layer into the crystal fiber by heating so that the refractive index of the outer portion of the crystal fiber is relatively low and forms the waveguide effect. The disadvantage of this type is that it is time consuming, needing about ten hours to diffuse the oxide layer into the crystal fiber. Another type is implanting ions into the crystal fiber by high-energy ion beam so that the refractive index of the outer portion of the crystal fiber implanted with ions is relatively low and forms the waveguide effect. The disadvantage of this type is expensive instrument.

2. Out Diffusion

In this method, the waveguide effect is achieved by the gradient index caused by the ions doped in the crystal fiber, because the doping ions diffuse outward during the growth process of the crystal fiber. The disadvantage of this method is that the waveguide effect is relative to the characteristic of doping ions because the concentration distributions caused by different ions will have different refractive indices.

3. Electron Gun (E-Gun) Deposition

The outer surface of a crystal fiber is covered with an evaporated oxide layer by an electron gun, wherein the refractive index of the oxide layer is lower than that of the crystal fiber. A disadvantage of this method is that the interface between the oxide layer and the surface of the crystal fiber is not dense enough and will transform according outside atmosphere.

4. Dip Coating

A crystal fiber is merged in a solution containing glass particles at first. After the glass particles have deposited on the surface of the crystal fiber, the crystal fiber is taken out of the solution and is dried by fire. Then cladding is achieved by repeating the merging and drying procedures several times. The disadvantage of this method is that it is time consuming.

5. Extrusion Method

Low-melting point glass is disposed in a funnel made by fused silica and is molten to liquid state when the funnel is heated under suitable conditions. Then, a crystal fiber is disposed in the funnel and extruded from a thinner end of the funnel slowly. Therefore, cladding is achieved while the crystal fiber is being extruded. The disadvantage of this method is that bubbles may occur in the space between the crystal fiber and the cladding glass.

Consequently, there is an existing need for a novel and improved fiber and the method of making the same to solve the above-mentioned problems.

SUMMARY OF THE INVENTION

One objective of the present invention is to provide a fiber having a core of crystal fiber doped with chromium and a glass cladding. The fiber has a gain bandwidth of more than 300 nm including 1.3 µm to 1.6 µm in optical communication, and can be used as light source, optical amplifier and tunable laser when being applied on optical fiber communication.

Another objective of the present invention is to provide a method of making a fiber having a core and a cladding, comprising:

(a) providing a source material;
(b) putting the source material into a fabricating apparatus;
(c) forming the core from the source material in the fabricating apparatus;
(d) inserting the core into a hollow glass tube; and
(e) heating the core and the hollow glass tube to form the fiber due to welding and ion diffusion.

Because it is a high temperature manufacture process, the cladding manufactured by this method is denser than that by evaporation technique, and can endure relative high damage threshold power for the pumping light.

Yet another objective of the present invention is to provide a wideband amplified spontaneous emission light source comprising: a pumping light source, a fiber and an output port. The pumping light source is used for generating a pumping light. The fiber has a core doped with chromium and a glass cladding, and is connected to the pumping light source for receiving the pumping light so as to excite the chromium ions therein. The output port is connected to the fiber and used for outputting amplified spontaneous emission (ASE) light.

DETAILED DESCRIPTION OF THE INVENTION

The method of making a fiber according to the present invention mainly comprises two steps: growing step and cladding step.

Figure 1:
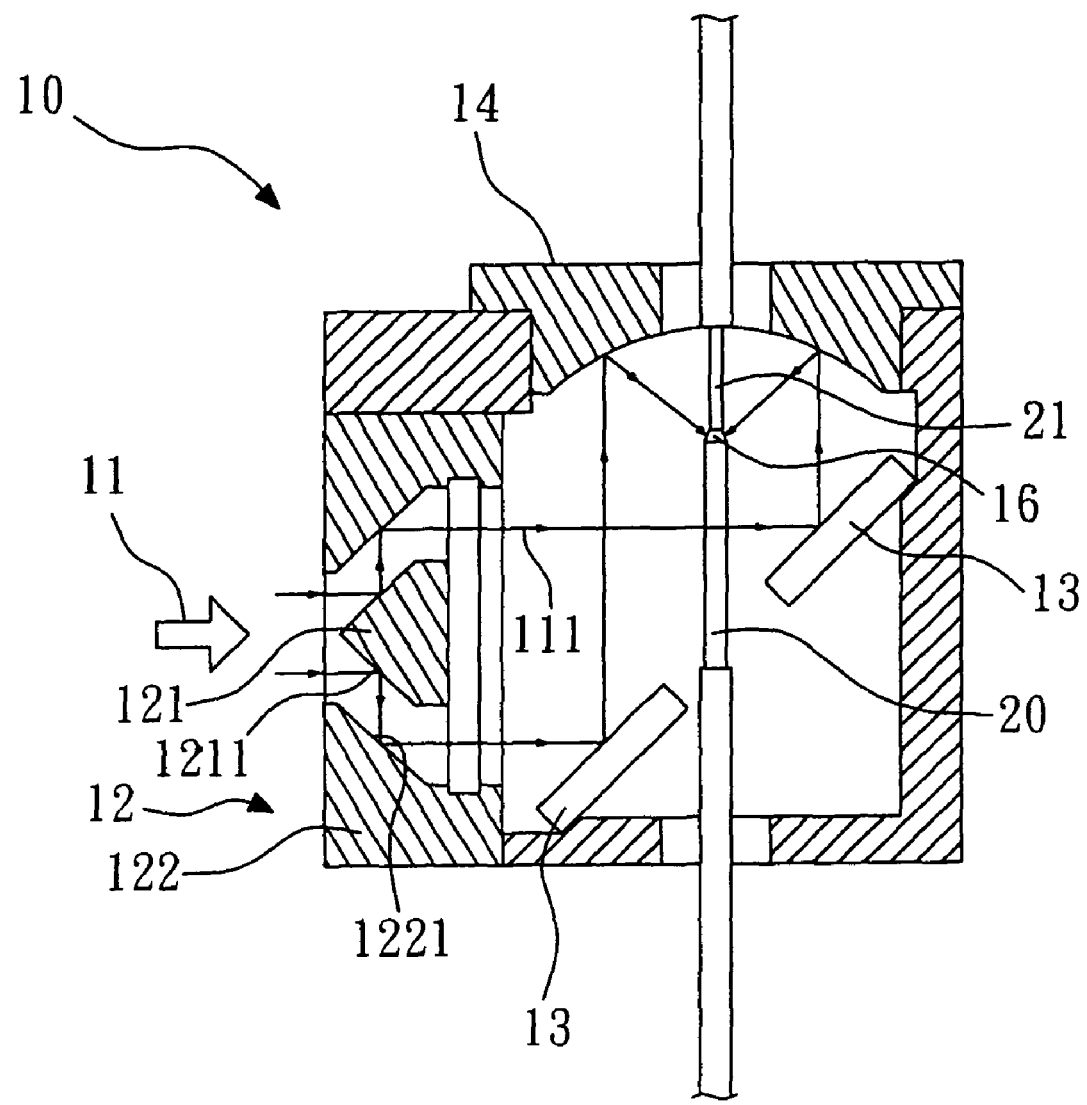
FIG. 1 shows a schematic diagram of a chamber of a fabricating apparatus for fabricating a crystal fiber according to the growing step of the present invention.

FIG. 1 shows a schematic diagram of a chamber of a fabricating apparatus for fabricating a crystal fiber according to the growing step of the present invention. The apparatus 10 is a laser heated pedestal growth (LHPG) apparatus, which is used for making a source material (for example, a source crystal rod 20) into a crystal fiber 21. In this embodiment, the material of the source crystal rod 20 is YAG crystal doped with $Cr^{4+}$ ions. Alternatively, the material of the source material may be glass having garnet structure or ceramic, doped with chromium. A molten zone 16 is formed on the interface between the source crystal rod 20 and the crystal fiber 21. The apparatus 10 comprises a laser beam generator (not shown), a beam splitter 12, a bending mirror 13 and a paraboloidal mirror 14.

The laser beam generator is used for generating a $CO_2$ laser beam 11. The beam splitter 12 includes an outer cone 121 and an inner cone 122. The outer cone 121 has a first conical surface 1211 and the inner cone 122 has a second conical surface 1221, respectively. The beam splitter 12 is used for splitting the laser beam 11 into a generally annular beam 111. The bending mirror 13 is used for reflecting the annular beam 111 from the beam splitter 12 and projecting it to the paraboloidal mirror 14. The paraboloidal mirror 14 is used for reflecting the annular beam 111 from the bending mirror 13, and focusing the annular beam 111 on the molten zone 16 at the tip of the source crystal rod 20.

Figure 2A:
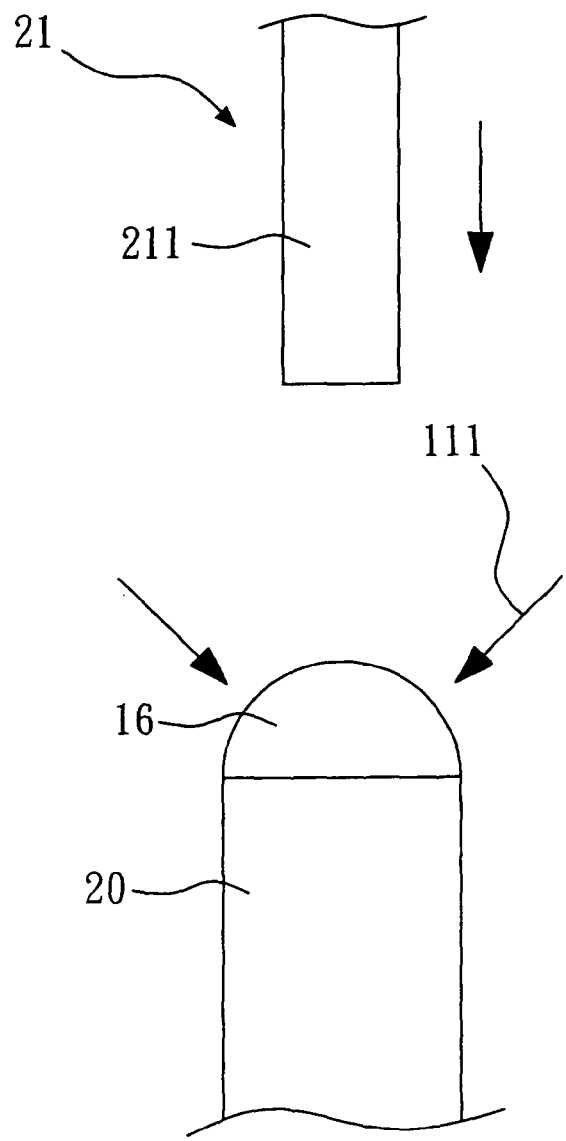
FIGS. 2a and 2b are schematic diagrams showing the growth procedure of the crystal fiber in the present invention.
Figure 2B:
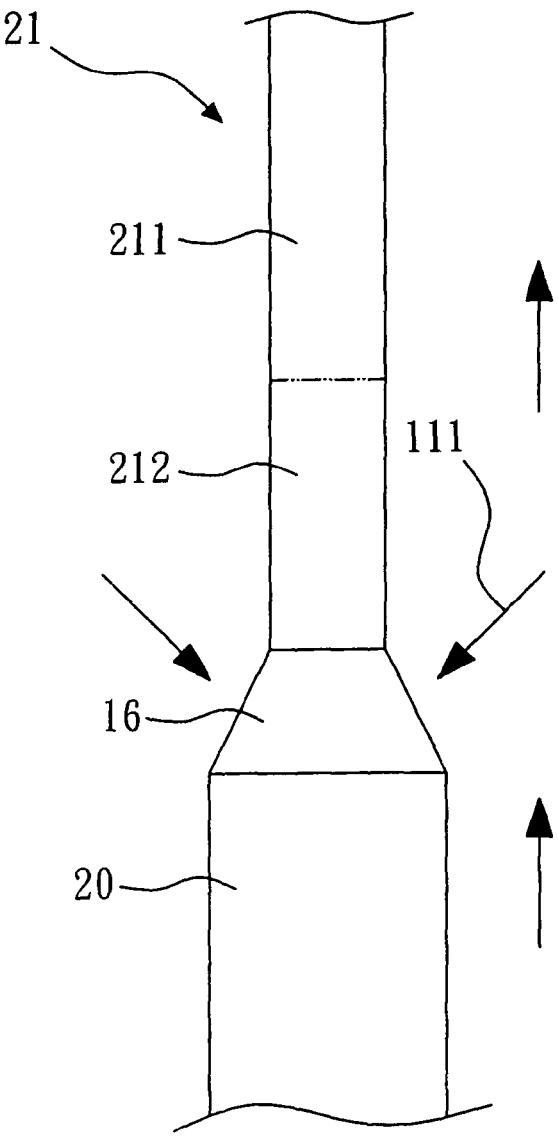

FIGS. 2a and 2b are schematic diagrams showing the growth procedure of the crystal fiber 21 in the present invention. First, as shown in FIG. 2a, the tip of the source crystal rod 20 can be melted to form the molten zone 16 by utilizing the laser beam 11 with desired output power from the laser beam generator. Then, an oriented seed 211 is heated by the $CO_2$ annular laser beam 111 in the chamber and is fed downward to dip in the molten zone 16. Then, as shown in FIG. 2b, the oriented seed 211 is pulled upward slowly, while the source crystal rod 20 is fed toward the molten zone 16 so that a new grown crystal zone 212 is formed at the bottom of the oriented seed 211, wherein the crystal orientation of the new grown crystal zone 212 is the same as that of the oriented seed 211. The diameter of the new grown crystal zone 212 is determined by the square root of the ratio of the pull speed of the oriented seed 211 to the feed speed of the source crystal rod 20. For example, if the ratio of the pull speed of the oriented seed 211 to the feed speed of the source crystal rod 20 is 16:1, the diameter ratio of the new grown crystal zone 212 to the source crystal rod 20 is 1:4.

The following discloses the material analysis of the crystal fiber 21. The crystal fiber 21 is cut into a predetermined length after the above-mentioned growing step, and then mounted in a PbSn alloy so as to facilitate heat conduction. Finally, two end facets and one side facet of the crystal fiber 21 were ground and polished to obtain a good surface quality without any major scratches for the following experiment and measurement. Additionally, the broadband ASE light source of a band including 1.3 μm to 1.6 μm is caused by the transition of the chromium in the quadrivalent state ($Cr^{4+}$). Since most chromium ions entering YAG crystal tend to become octahedrally coordinated $Cr^{3+}$ (for example, by doping $Cr_2O_3$), in order to incorporate the chromium in the quadrivalent state ($Cr^{4+}$), a co-doping of CaO or MgO was used to generate $Ca^{2+}$ or $Mg^{2+}$ for charge compensation.

Figure 3:
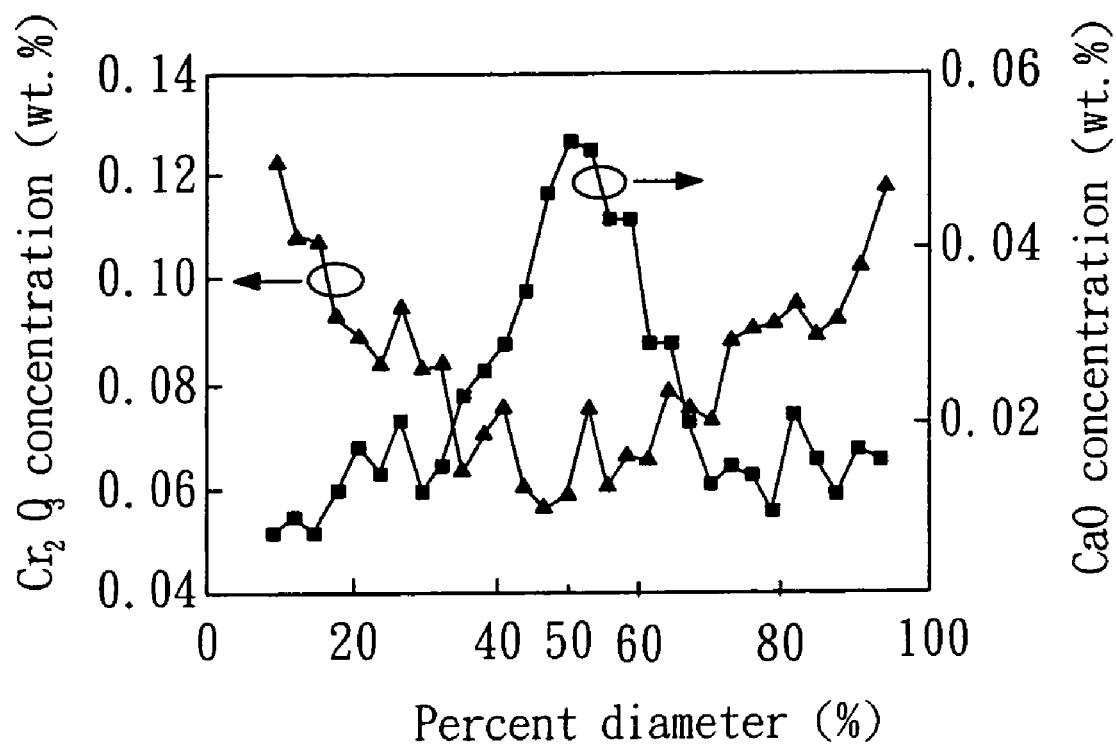
FIG. 3 shows the concentration distributions of doping ions on the cross-section of the $Cr^{4+}$:YAG crystal fiber measured by an electron probe micro-analyzer (EPMA), wherein . designates the concentration of $Cr_2O_3$ and designates the concentration of CaO.

FIG. 3 shows the concentration distributions of doping ions on the cross-section of the $Cr^{4+}$:YAG crystal fiber 21 measured by an electron probe micro-analyzer (EPMA), wherein . designates the concentration of $Cr_2O_3$ and . designates the concentration of CaO. The abscissa of the figure (percent diameter) designates the abscissa of the cross-section of the crystal fiber 21, and therefore, percent diameter of 50% designates the center of the crystal fiber 21. As shown in the figure, the concentration distributions of doping ions are in gradient profiles, and the average doping concentration for CaO and $Cr_2O_3$ are 0.015% and 0.1%, respectively. The concentration distribution of calcium is high at center and low at two sides, which suggests that the concentration distribution of $Cr^{4+}$ is also high at center and low at two sides. Since $Cr^{4+}$ is the active ion for ASE generation, more $Cr^{4+}$ in the center of the crystal fiber 21 results in gain guided ASE. On the contrary, the concentration distribution of $Cr^{3+}$ is low at center and high at two sides. From the EPMA measurements of samples with different growth conditions, an empirical formula was derived for the average $Cr_2O_3$ concentration of the crystal fiber 21 after growth:

$$C_{Cr_2O_3} = 0.75 C_0 \sqrt{\frac{v}{\gamma}}$$

wherein $C_0$ is the average concentration of $Cr_2O_3$ in the source crystal rod 20, λ is the growth speed of the crystal fiber 21, which is between 0.75 and 3.75 mm/min, and γ is the pull/push speed ratio. After growth, the average concentration of CaO in the grown crystal fiber 21 is slightly lower than that in the source crystal rod 20, typically less than 10%.

Figure 4:
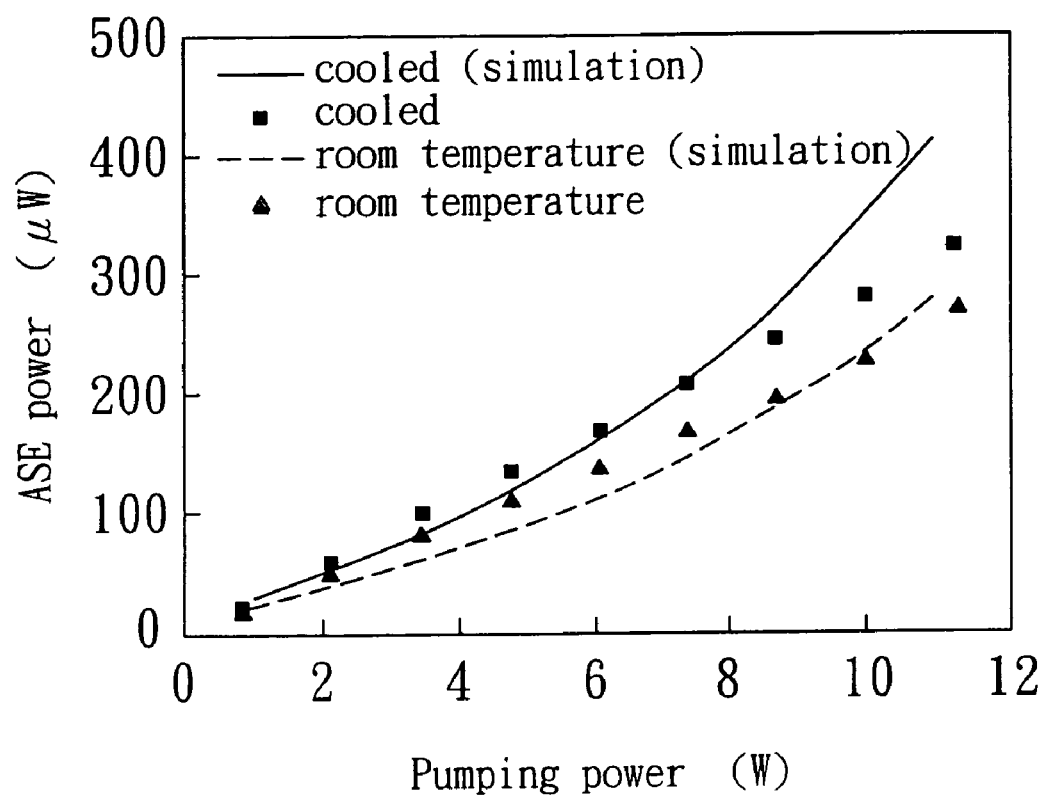
FIG. 4 shows the measured and simulated results of power of the ASE caused by pumping the side face of the $Cr^{4+}$:YAG crystal fiber by 980-nm laser array under different temperatures.

FIG. 4 shows the measured and simulated results of power of the ASE caused by pumping the side face of the $Cr^{4+}$:YAG crystal fiber 21 by 980-nm laser array under different temperatures (−14° C. and 29° C.), wherein the $Cr^{4+}$:YAG crystal fiber 21 is packaged with PbSn alloy in a copper groove and is clamped to a cooled copper heat sink. In the figure, the solid line designates the simulation result at a cooled temperature of −14° C., . designates the measured result at a cooled temperature of −14° C., the dotted line designates the simulation result at a room temperature of 29° C., and designates the measured result at a room temperature of 29° C. As shown in the measured result of the figure, an ASE power of 324 μW can be reached at temperature of −14° C., which has an increment of 19.1% compared with that at 29° C. Under high pumping power, the ASE power of measured result is much lower than that of simulation result, and the fluorescence lifetime of $Cr^{4+}$:YAG decays due to thermal quenching.

Figure 5:
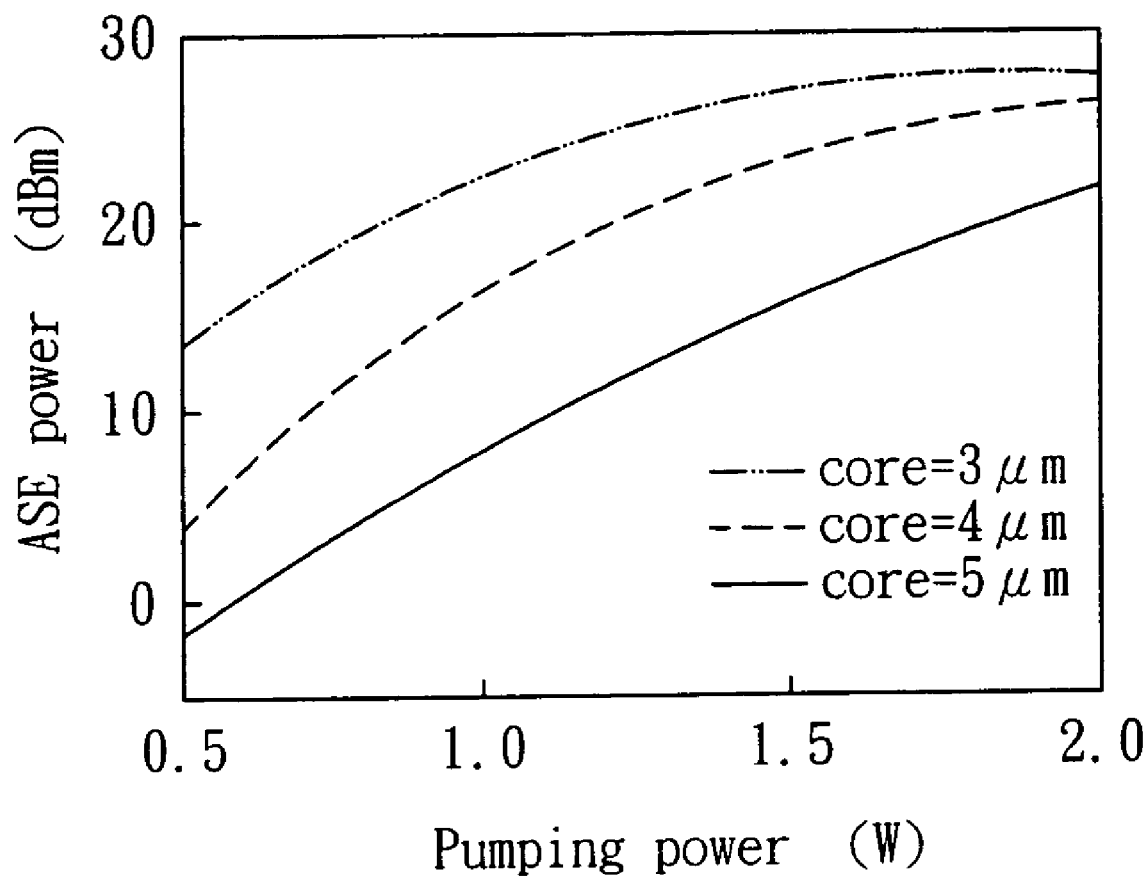
FIG. 5 shows the simulation results of ASE power of $Cr^{4+}$: YAG crystal fiber with different diameters.

FIG. 5 shows the simulation results of ASE power of $Cr^{4+}$:YAG crystal fiber 21 with different diameters. The pumping configuration of the simulation is an end-pumping scheme. The results indicate that the smaller core diameter the $Cr^{4+}$:YAG crystal fiber 21 has, the higher ASE power it has.

Figure 6:
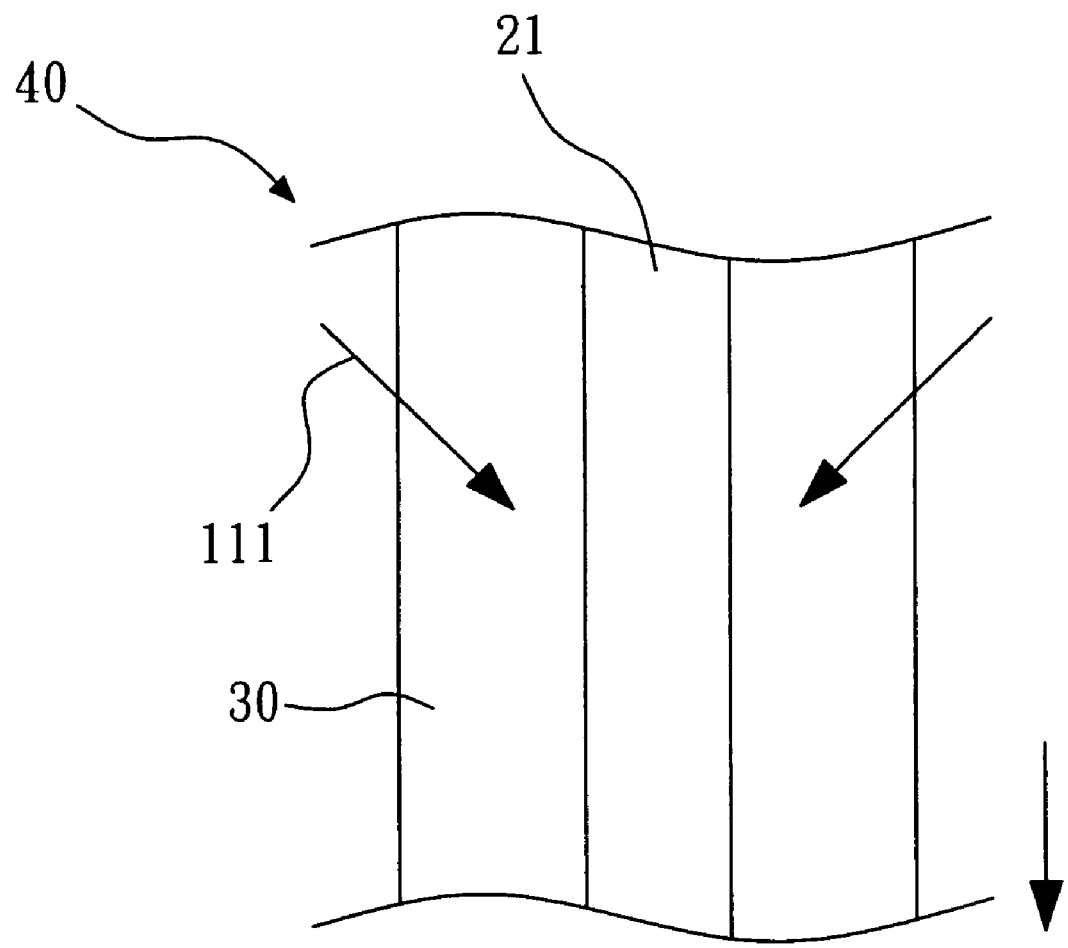
FIG. 6 is a schematic diagram showing the cladding step according to the present invention.

FIG. 6 is a schematic diagram showing the cladding step according to the present invention. The $Cr^{4+}$:YAG crystal fiber 21 made by above-mentioned process needs to proceed a cladding step. First, the $Cr^{4}$:YAG crystal fiber 21 is inserted into a hollow glass tube 30 whose inner diameter is slightly bigger than the outer diameter of the crystal fiber 21. The material of the hollow glass tube 30 is glass, preferably borosilicate glass or fused-silica glass. Then, the crystal fiber 21 and the hollow glass tube 30 are disposed in the chamber of the apparatus 10 and heated by the annular $CO_2$ laser beam 111. The feed direction of the crystal fiber 21 and the hollow glass tube 30 is downward, which is called downward growth. Finally, a fiber 40 having a core (i.e., the crystal fiber 21) doped with chromium and a glass cladding (i.e., the hollow glass tube 30) is formed due to welding and ion diffusion. Such a new method is called codrawing laser-heated pedestal growth method (CDLHPG). Because it is a high temperature manufacture process, the quality of the cladding manufactured by this method is denser than that by evaporation technique, and the cladding manufactured by this method can withstand relative high damage threshold power for the pumping light.

Figure 7:
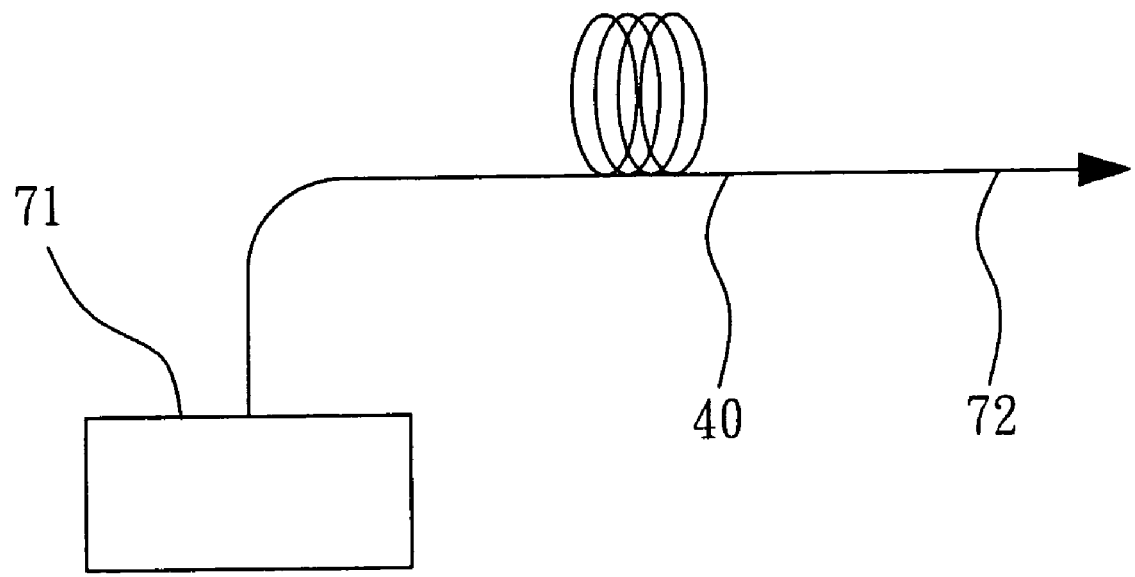
FIG. 7 shows a super wideband amplified spontaneous emission light source according to the present invention.

FIG. 7 shows a super wideband amplified spontaneous emission light source according to the present invention. The light source comprises a pumping light source 71, the fiber 40 fabricated by the above-mentioned method, and an output port 72. The pumping light source 71 and the output port 72 are connected to two ends of the fiber 40, respectively. The pumping light source 71 is used for generating a pumping light that is propagated into the fiber 40 to excite the chromium in the quadrivalent state ($Cr^{4+}$) therein so as to output amplified spontaneous emission (ASE) light through the output port 72. The pumping light and the ASE light are in the same or opposite propagation directions. The wavelength of the pumping light generated by the pumping light source 71 is between 0.8 to 1.2 μm. The half-width of the ASE light through the output port 72 is between 1.2 to 1.65 μm, which has a gain bandwidth of more than 300 nm.

Figure 8:
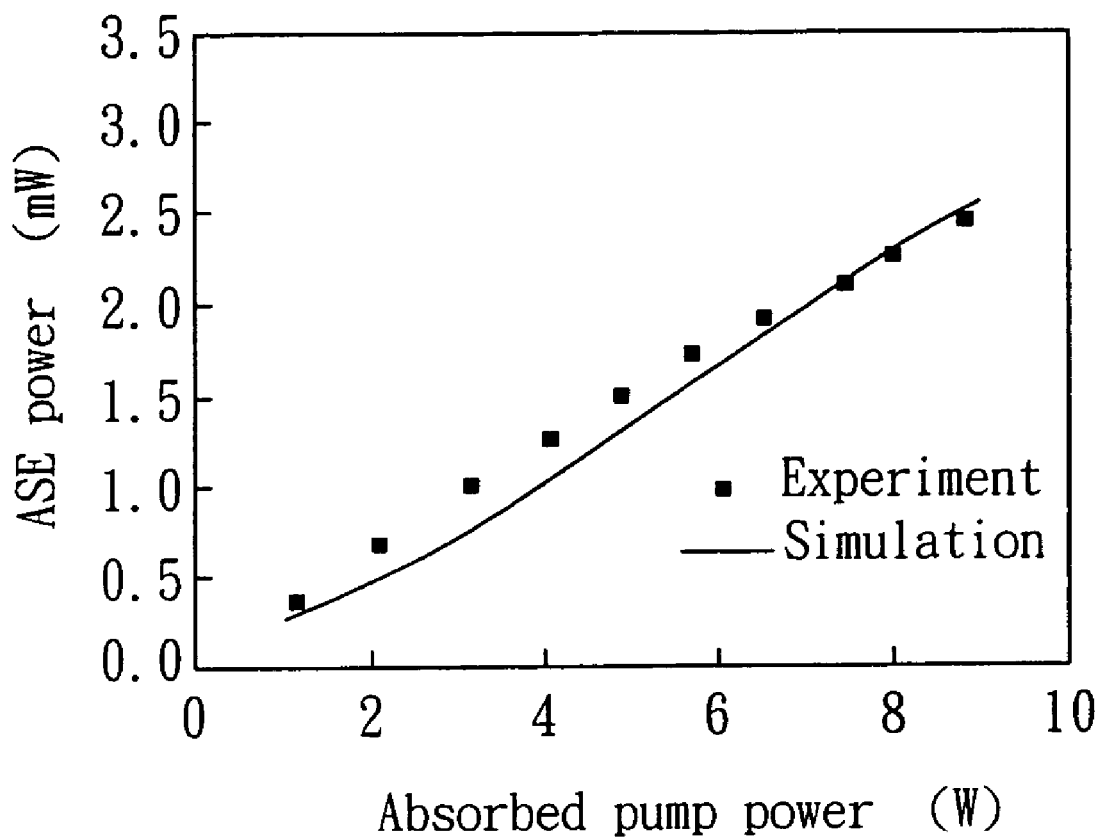
FIG. 8 shows the ASE output power of a Cr:YAG crystal fiber having a glass cladding with an inner diameter of 100 μm.

FIG. 8 shows the ASE output power of a Cr:YAG crystal fiber having a glass cladding with a inner diameter of 100 μm, wherein the ASE is caused by pumping the end face of the Cr:YAG crystal fiber by a 1064 nm and 8.8 W laser. As shown in the figure, as much as 2.45 mW of the ASE power is obtained, which has effective improvement compared with side pumping. If the pumping light can be coupled into a fiber having a smaller diameter, the pumping light and the ASE light will have higher intensity, which can raise population inversion and enhance the ASE output power.

According to the present invention, a $Cr^{4+}$:YAG crystal fiber with a diameter of 66 μm is inserted into a fused silica tube with an inner diameter of 76 μm. Then, a fiber having a core of $Cr^{4+}$:YAG crystal fiber with a diameter of 29 μm and a cladding of fused silica tube with a inner diameter of 64 μm is fabricated successfully. Therefore, $Cr^{4+}$:YAG crystal fiber with a diameter of several micro-meters may be fabricated according to the present invention so as to obtain ASE power of tens of dBms.

While several embodiments of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A method of making a fiber having a core and a cladding, wherein the fiber can be used as a light source, optical amplifier and timeable laser, the method comprising the steps of:
   (a) providing a source material selected from the group consisting of crystal, glass having garnet structure and ceramic;
   (b) putting the source material into a laser heated system provided with an annular laser beam;
   (c) forming the core from the source material in the laser heated system forming the core by (i) disposing the source material in a laser heated pedestal growth apparatus, (ii) melting a tip of the source material with an annular laser beam to form a molten zone at the tip, (iii) dipping a seed crystal into the molten zone, and (iv) pulling the seed crystal away from the molten zone to form the core at the bottom of the seed crystal;
   (d) inserting the core into a hollow glass tube; and
   (e) heating the core and the hollow glass tube by co-feeding the hollow glass tube with inserted core in the same feed direction in the laser heated system and causing the annular laser beam to be applied to the co-fed hollow glass tube with inserted core at the hollow glass tube so as to heat the hollow glass tube and core together and thereby to form the fiber by welding and ion diffusion.

2. The method according to claim 1, wherein the laser heated system is a laser heated pedestal growth (LHPG) apparatus.

3. The method according to claim 1, wherein the core is doped with chromium.

4. The,method according to claim 3, wherein the core is $Cr^{4+}$:YAG.

5. The method according to claim 3, wherein the core is further doped with a material selected from a group consisting of $Cr_2O_3$, CaO, MgO and the mixture thereof.

6. The method according to claim 1, wherein the material of the core is crystal.

7. The method according to claim 1, wherein the material of the core is glass having garnet structure.

8. The method according to claim 1, further comprising a step of putting the core and the hollow glass tube into the laser heated system after step (d).

9. The method according to claim 1, wherein the source material comprises $Cr^{4+}$:YAG or glass having a garnet structure.

10. A method of making a fiber having a core and a cladding, wherein the fiber can be used as a light source, optical amplifier and timeable laser, the method consisting of the steps of:

(a) providing a source material selected from the group consisting of crystal, glass having garnet structure and ceramic;
(b) forming the core by (i) disposing the source material in a laser heated pedestal growth apparatus, (ii) melting a tip of the source material with an annular laser beam to form a molten zone at the tip, (iii) dipping a seed crystal into the molten zone, and (iv) pulling the seed crystal away from the molten zone to form the core at the bottom of the seed crystal; and
(c) forming the cladding by a process consisting of (i) inserting the core into a hollow glass tube; and (ii) heating the core and the hollow glass tube by co-feeding the hollow glass tube with inserted core in the same feed direction in the laser heated pedestal growth apparatus and causing the annular laser beam to be applied to the co-fed hollow glass tube with inserted core at the hollow glass tube so as to heat the hollow glass tube and core together and thereby to form the fiber by welding and ion diffusion.

11. The method according to claim 10, wherein the source material comprises $Cr^{4+}$:YAG or glass having a garnet structure.

* * * * *